US012641160B2

(12) United States Patent
Are et al.

(10) Patent No.: US 12,641,160 B2
(45) Date of Patent: May 26, 2026

(54) DEVICE TASKS ON A CONTEXT-AWARE DEVICE CHARGER

(71) Applicant: QUALCOMM Incorporated, San Diego, CA (US)

(72) Inventors: Ravinder Are, Hyderabad (IN); Rajeevalochana R, Hyderabad (IN); Praveen Kandukuri, Chilakaluripet (IN); Utkarsh Verma, Lucknow (IN); Shivram Arunrao Deshmukh, Vidul (IN); Hari Krishna Munagala, Giddalur (IN)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 18/750,553

(22) Filed: Jun. 21, 2024

(65) Prior Publication Data

US 2025/0392646 A1     Dec. 25, 2025

(51) Int. Cl.
| | |
|---|---|
| *G06F 15/16* | (2006.01) |
| *H04L 9/40* | (2022.01) |
| *H04L 67/148* | (2022.01) |
| *H04L 67/1097* | (2022.01) |

(52) U.S. Cl.
CPC ............ *H04L 67/148* (2013.01); *H04L 63/08* (2013.01); *H04L 67/1097* (2013.01)

(58) Field of Classification Search
CPC .... H04L 63/08; H04L 67/148; H04L 67/1097
USPC ........................................................ 709/224
See application file for complete search history.

(56) References Cited

U.S. PATENT DOCUMENTS

| | | | | |
|---|---|---|---|---|
| 10,425,411 | B2 * | 9/2019 | Huang | H04L 9/3268 |
| 10,439,890 | B2 * | 10/2019 | Kattepur | H04W 4/70 |
| 10,440,096 | B2 * | 10/2019 | Sabella | H04L 47/803 |
| 11,050,813 | B2 * | 6/2021 | Sabella | H04W 28/0205 |
| 11,234,204 | B2 * | 1/2022 | Ding | G07C 5/008 |
| 11,503,113 | B2 * | 11/2022 | Dong | H04L 67/289 |
| 11,627,444 | B2 * | 4/2023 | Ruan | H04W 36/0033 370/252 |
| 11,627,528 | B2 * | 4/2023 | Hu | H04W 52/0219 370/329 |
| 11,671,483 | B2 * | 6/2023 | Julien | H04L 47/2441 709/226 |
| 11,683,393 | B2 * | 6/2023 | Li | H04L 67/59 709/202 |

(Continued)

*Primary Examiner* — Moustafa M Meky
(74) *Attorney, Agent, or Firm* — AVEK IP, LLC (QUALCOMM)

(57) ABSTRACT

This disclosure provides methods, components, devices, and systems for providing task offloading services from a device onto a device charger in a secure device ecosystem. Some aspects, more specifically, relate to a context-aware device charger communicating with a trusted device within the secure device ecosystem where the device can offload tasks and computations to the device charger. In some aspects, the trusted device transmits a context state during operation across the secure device ecosystem, which can be received by the device charger, where the context state includes a task associated with an activity on the device. The device charger may perform services associated with the task, such as performing computations associated with the task, and may transmit information associated with the computations back to the trusted device.

30 Claims, 10 Drawing Sheets

(56) References Cited

U.S. PATENT DOCUMENTS

| | | | | |
|---|---|---|---|---|
| 11,695,821 | B2 * | 7/2023 | Sabella | H04L 67/04 |
| | | | | 709/226 |
| 11,831,708 | B2 * | 11/2023 | Li | H04L 67/10 |
| 11,915,050 | B2 * | 2/2024 | Albanese | G06F 9/5027 |
| 11,956,307 | B1 * | 4/2024 | Li | H04L 67/1023 |
| 11,991,260 | B2 * | 5/2024 | Badic | H04L 67/59 |
| 12,068,916 | B2 * | 8/2024 | Kattepur | B25J 9/1664 |
| 12,095,848 | B2 * | 9/2024 | De Foy | H04L 67/34 |
| 12,185,230 | B2 * | 12/2024 | Ding | H04W 4/40 |
| 12,200,041 | B2 * | 1/2025 | Sabella | H04W 52/0264 |
| 12,399,756 | B2 * | 8/2025 | Liu | G07C 5/008 |
| 12,407,608 | B2 * | 9/2025 | Lu | H04L 45/566 |
| 12,417,129 | B2 * | 9/2025 | Liu | G06F 9/5055 |
| 12,418,778 | B2 * | 9/2025 | Yang | H04W 4/38 |
| 2018/0109428 | A1 * | 4/2018 | Kattepur | H04W 4/70 |
| 2021/0136142 | A1 * | 5/2021 | Dong | G06F 9/5094 |
| 2022/0317692 | A1 * | 10/2022 | Guim Bernat | G05D 1/0217 |
| 2023/0081937 | A1 * | 3/2023 | Liu | H04L 67/34 |
| | | | | 718/104 |
| 2023/0106425 | A1 * | 4/2023 | Lu | H04L 45/566 |
| | | | | 709/238 |
| 2023/0199061 | A1 * | 6/2023 | Li | H04L 67/1023 |
| | | | | 709/223 |
| 2023/0275813 | A1 * | 8/2023 | Feng | H04B 17/345 |
| | | | | 718/102 |
| 2023/0401094 | A1 * | 12/2023 | Albanese | G06F 9/54 |
| 2024/0129363 | A1 * | 4/2024 | Li | H04L 67/1023 |
| 2024/0323657 | A1 * | 9/2024 | Yang | H04W 4/40 |
| 2025/0165311 | A1 * | 5/2025 | Liu | G06F 9/5094 |
| 2025/0240343 | A1 * | 7/2025 | Chen | G06N 20/00 |

* cited by examiner

800

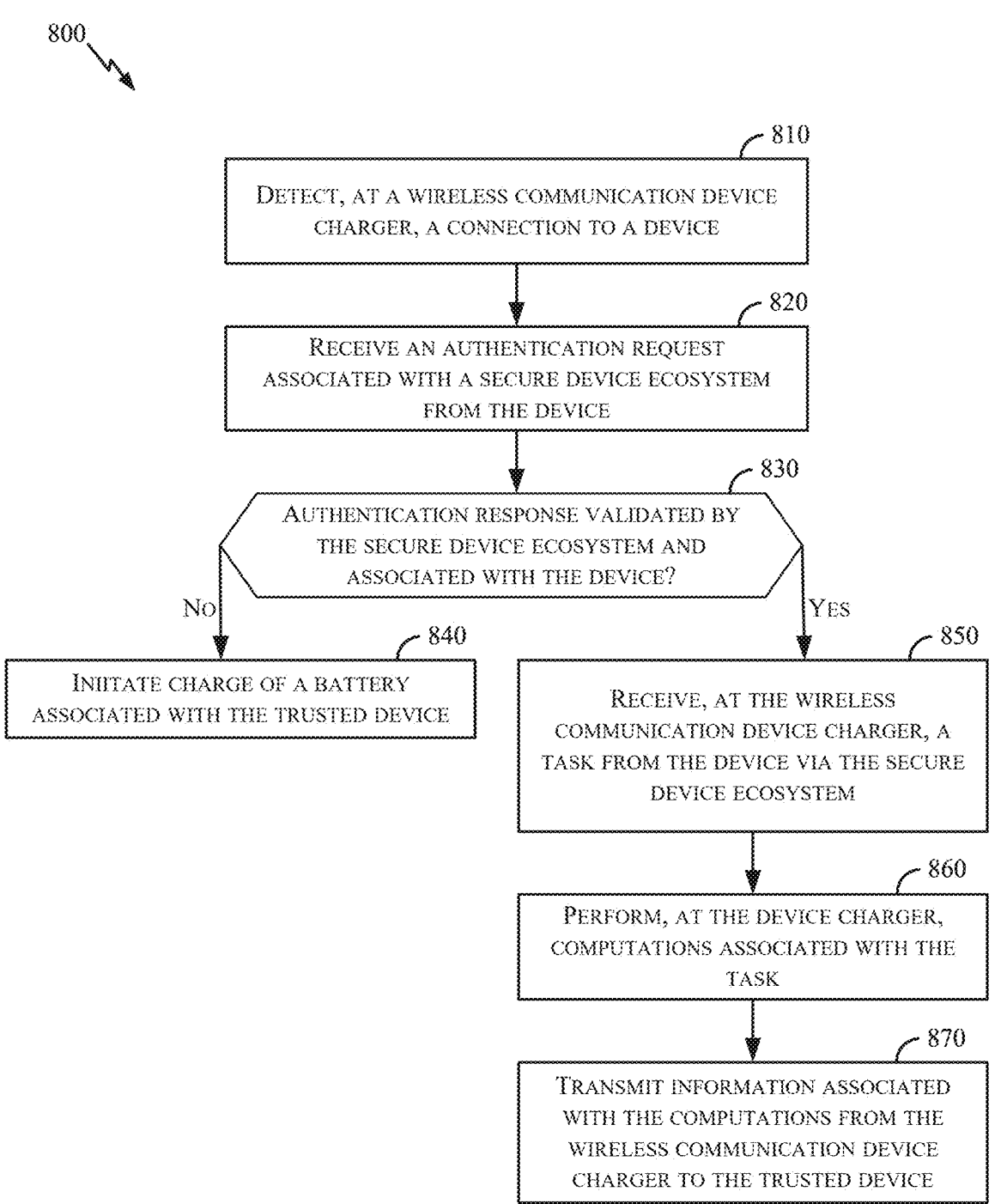

810

DETECT, AT A WIRELESS COMMUNICATION DEVICE
CHARGER, A CONNECTION TO A DEVICE

820

RECEIVE AN AUTHENTICATION REQUEST
ASSOCIATED WITH A SECURE DEVICE ECOSYSTEM
FROM THE DEVICE

830

AUTHENTICATION RESPONSE VALIDATED BY
THE SECURE DEVICE ECOSYSTEM AND
ASSOCIATED WITH THE DEVICE?

NO                                    YES

840

INITIATE CHARGE OF A BATTERY
ASSOCIATED WITH THE TRUSTED DEVICE

850

RECEIVE, AT THE WIRELESS
COMMUNICATION DEVICE CHARGER, A
TASK FROM THE DEVICE VIA THE SECURE
DEVICE ECOSYSTEM

860

PERFORM, AT THE DEVICE CHARGER,
COMPUTATIONS ASSOCIATED WITH THE
TASK

870

TRANSMIT INFORMATION ASSOCIATED
WITH THE COMPUTATIONS FROM THE
WIRELESS COMMUNICATION DEVICE
CHARGER TO THE TRUSTED DEVICE

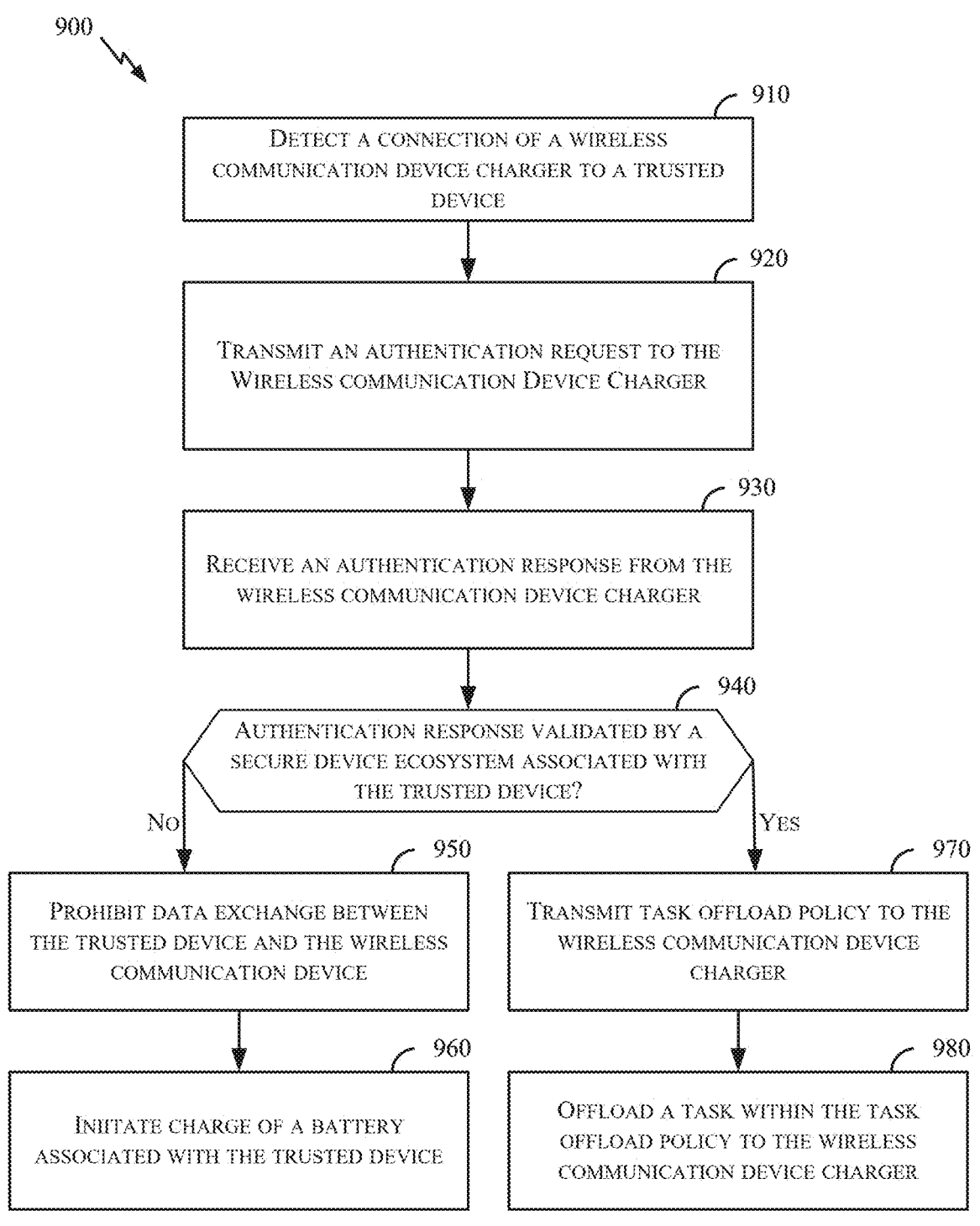

910

DETECT A CONNECTION OF A WIRELESS COMMUNICATION DEVICE CHARGER TO A TRUSTED DEVICE

920

TRANSMIT AN AUTHENTICATION REQUEST TO THE WIRELESS COMMUNICATION DEVICE CHARGER

930

RECEIVE AN AUTHENTICATION RESPONSE FROM THE WIRELESS COMMUNICATION DEVICE CHARGER

940

AUTHENTICATION RESPONSE VALIDATED BY A SECURE DEVICE ECOSYSTEM ASSOCIATED WITH THE TRUSTED DEVICE?

No                                    Yes

950

PROHIBIT DATA EXCHANGE BETWEEN THE TRUSTED DEVICE AND THE WIRELESS COMMUNICATION DEVICE

970

TRANSMIT TASK OFFLOAD POLICY TO THE WIRELESS COMMUNICATION DEVICE CHARGER

960

INITIATE CHARGE OF A BATTERY ASSOCIATED WITH THE TRUSTED DEVICE

980

OFFLOAD A TASK WITHIN THE TASK OFFLOAD POLICY TO THE WIRELESS COMMUNICATION DEVICE CHARGER

*FIGURE 9*

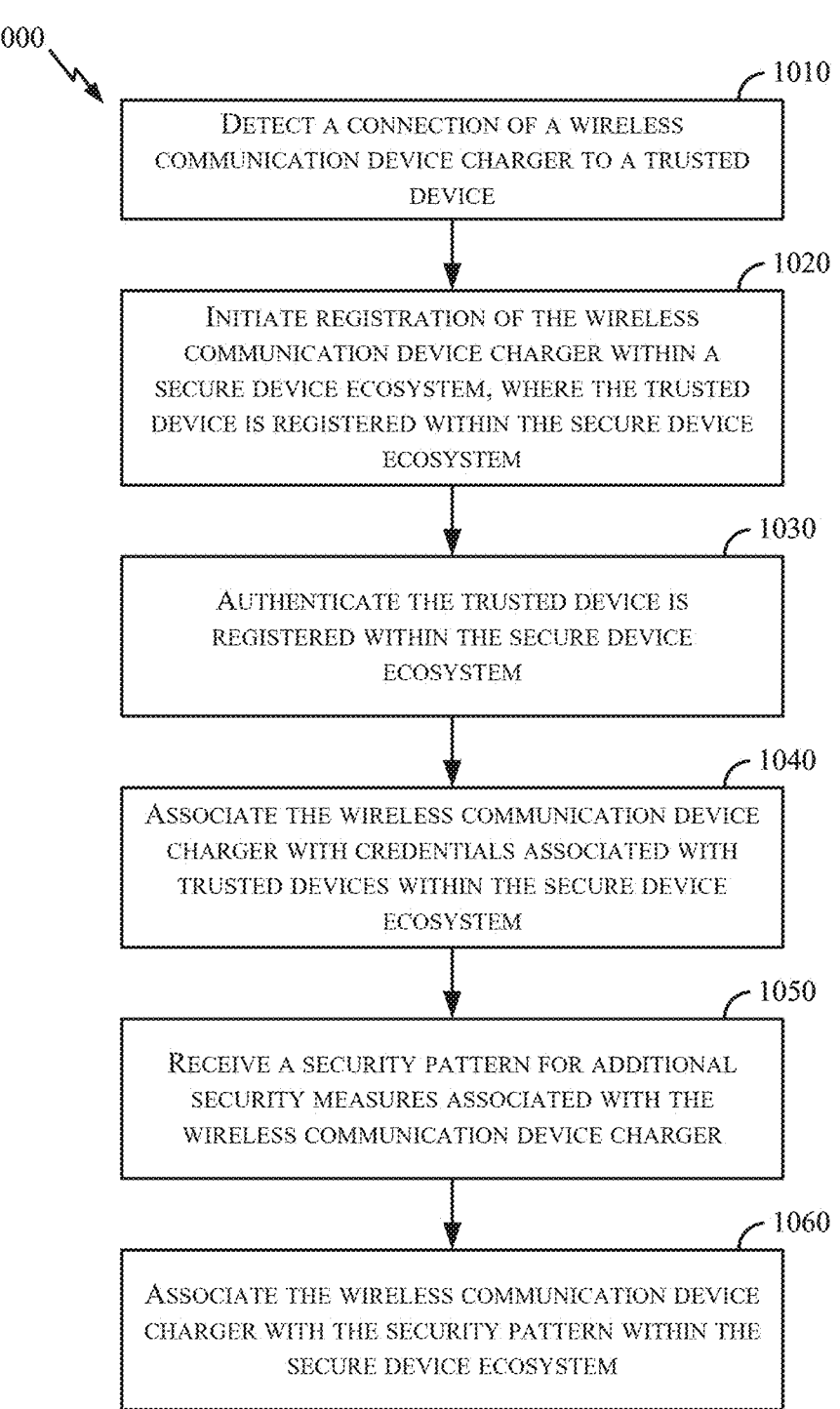

1000

1010
DETECT A CONNECTION OF A WIRELESS COMMUNICATION DEVICE CHARGER TO A TRUSTED DEVICE

1020
INITIATE REGISTRATION OF THE WIRELESS COMMUNICATION DEVICE CHARGER WITHIN A SECURE DEVICE ECOSYSTEM, WHERE THE TRUSTED DEVICE IS REGISTERED WITHIN THE SECURE DEVICE ECOSYSTEM

1030
AUTHENTICATE THE TRUSTED DEVICE IS REGISTERED WITHIN THE SECURE DEVICE ECOSYSTEM

1040
ASSOCIATE THE WIRELESS COMMUNICATION DEVICE CHARGER WITH CREDENTIALS ASSOCIATED WITH TRUSTED DEVICES WITHIN THE SECURE DEVICE ECOSYSTEM

1050
RECEIVE A SECURITY PATTERN FOR ADDITIONAL SECURITY MEASURES ASSOCIATED WITH THE WIRELESS COMMUNICATION DEVICE CHARGER

1060
ASSOCIATE THE WIRELESS COMMUNICATION DEVICE CHARGER WITH THE SECURITY PATTERN WITHIN THE SECURE DEVICE ECOSYSTEM

*FIGURE 10*

DEVICE TASKS ON A CONTEXT-AWARE DEVICE CHARGER

TECHNICAL FIELD

This disclosure relates generally to wireless communication, and, more specifically, to offloading tasks onto a context-aware device charger from devices associated with a distributed platform.

DESCRIPTION OF THE RELATED TECHNOLOGY

Wireless communication networks may include various types of wireless communication devices, including network entities (such as wireless access points (AP) or base stations (BS)), client devices (such as wireless stations (STAs) or user equipment (UEs)), and other wireless nodes. These wireless communication devices may communicate with one another via a variety of technologies and wireless communication protocols, including wireless local area network (WLAN) or, Wi-Fi-based protocols, or cellular (such as 4G, 5G, or 6G)-based protocols. The wireless communication networks may be capable of supporting communication with multiple users by sharing the available system resources (such as time, frequency, and spatial resources). To enable features or provide improved performance, the wireless communication devices may employ technologies such as orthogonal frequency divisional multiple access (OFDMA), multi-user Multiple-Input Multiple-Output (MU-MIMO), spatial multiplexing, and beamforming. For greater interoperability, the wireless communication networks may support backward compatibility (such as supporting legacy wireless communication devices) as well as forward compatibility (such as supporting communication with wireless communication devices compatible with next-generation wireless communication standards).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for task offloading by a context-aware device charger. The method includes receiving at a device charger, a context state from a trusted device within a secure device ecosystem with the device charger, where the context state includes a task associated with the trusted device, performing, at the device charger, computations associated with the task, and transmitting information associated with the computations from the device charger to the trusted device.

In some examples, performing the computations associated with the task further includes transmitting, from the device charger, data associated with the task over a network, receiving corresponding data from the network, and transmitting the corresponding data from the device charger to the trusted device.

In some examples, performing the computations associated with the task further include receiving, from the trusted device, at least one file stored in memory on the trusted device, and transmitting, over a network, the at least one file to a remote storage location associated with the trusted device.

In some examples, performing the computations associated with the task further include scanning files, by the device charger, stored in memory on the trusted device, detecting an un-synced file from the files, and transmitting, over a network, the un-synced file to a remote storage location associated with the trusted device.

Another innovative aspect of the subject matter described in this disclosure can be implemented in a context-aware device charger for task offloading from a device. The context-aware device charger includes a processing system that includes one or more processors and one or more memories coupled with the one or more processors, the processing system is configured to cause the context-aware device charger to receive a context state from a trusted device within a secure device ecosystem with the device charger, where the context state includes a task associated with the trusted device, perform computations associated with the task, and transmit information associated with the computations from the device charger to the trusted device.

In some examples, the processing system is further configured to cause the device charger to retrieve, prior to performing the computations, computational capabilities of the device charger, and verify the computational capabilities of the device charger to perform the task.

In some examples, where performing the computations associated with the task causes the context-aware device charger to transmit data associated with the task over a network, receive corresponding data from the network, and transmit the corresponding data from the device charger to the trusted device.

In some examples, the processing system is further configured to cause the context-aware device charger to connect the device charger with the trusted device, analyze a charge capability of a battery associated with the trusted device, and charge, by the device charger, the battery according to the charge capability of the battery over the connection.

Another innovative aspect of the subject matter described in this disclosure can be implemented in a wireless communication device for task offloading to a context-aware device charger. The wireless communication device includes a processing system that includes one or more processors and one or more memories coupled with the one or more processors, the processing system is configured to cause the wireless communication device to transmit a context state associated with the wireless communication device within a secure device ecosystem, where the context state includes a task associated with the wireless communication device, receive, from the device charger, an acknowledgment of the task, offload the task to the device charger, and receive information associated with computations for the task from the device charger.

In some examples, offloading the tasks causes the wireless communication device to transmit data associated with the task over a network to the device charger, and receive corresponding data from the device charger.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 8 shows a flowchart illustrating an example process performable by or at a wireless communication device charger that supports performing tasks offloaded by a wireless communication device.

FIG. 9 shows a flowchart illustrating an example process performable by or at a wireless communication device that supports offloading tasks onto a wireless communication device charger in a secure device ecosystem.

FIG. 10 shows a flowchart illustrating an example process performable by or at a wireless communication device that supports registering a wireless communication device charger to a secure device ecosystem.

Like reference numbers and designations in the various drawings indicate like elements.

DETAILED DESCRIPTION

Figure 1:
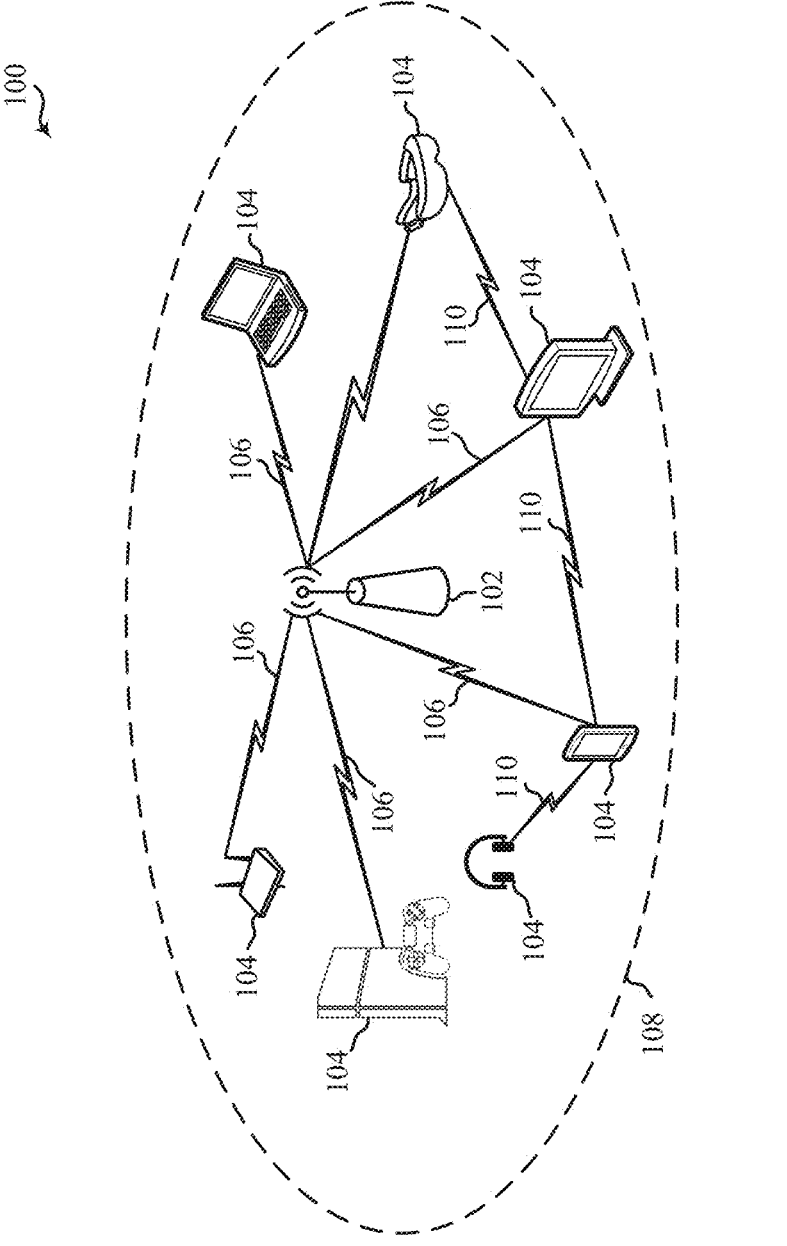
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the $3^{rd}$ Generation Partnership Project (3GPP), among others.

The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

Various aspects relate to device task offload services performed by a context-aware device charger and, more particularly, to a context-aware device charger communicating with a trusted device in a secure device ecosystem to provide tasks and computational services for the trusted devices on the context-aware device charger. In some examples, the secure device ecosystem is a distributed platform in the form of a distributed context fabric (DCF). DCF is a platform service that enables a privacy-preserving network of proximate devices to broadcast device contexts that enable cross-device communication. Some aspects relate to a context-aware device charger registering into or joining the secure device ecosystem, which includes one or more trusted devices that may utilize the device charger for offloading tasks and computations. In some aspects, the context-aware device charger may receive a remote credential request for authentication from a trusted device. Upon receiving the request, the context-aware charger may transmit credentials associated with the secure device ecosystem registered to the device charger and the trusted device. In some aspects, the trusted devices transmit their context state during operation across the secure device ecosystem, which can be received by the context-aware device charger. The context state can include an activity performed by a trusted device requiring tasks. In some aspects, the context-aware device charger may analyze its computational capabilities and evaluate whether the computational capabilities can execute the tasks associated with the context state of the trusted device. In some aspects, the context-aware device charger may perform services associated with the task and transmit and receive data over a network. In some additional aspects, the task may include power-consuming activities that the context-aware charger may perform while it charges the trusted device. Upon performing the computations associated with the task, the context-aware device charger may transmit information associated with the computations back to the trusted device.

Particular aspects of the subject matter described in this disclosure can be implemented to realize one or more of the following potential advantages. The present disclosure provides for alternate methods of computational tasks, including network communications and power-consuming activities, associated with a trusted device, and performed on a context-aware device charger on a secure network. For example, a trusted device may perform computationally intensive activities such as video rendering, gaming, and image processing. These activities may result in a faster battery drain on a device due to increased processor usage, memory usage, or network usage. By providing computational functionality on a context-aware device charger, these computationally intensive activities, as well as others, may be offloaded to the context-aware device charger to alleviate some of the computational load on the device. The present disclosure provides mechanisms that allow computational tasks indicated in the context states of devices to be performed by a context-aware device charger. By allowing the device charger to perform computational tasks for the trusted devices, those devices can lessen the computational burden imposed on those devices during use. Additionally, offloading computationally intensive tasks from trusted devices to a context-aware device charger may reduce, or otherwise avoid, the potential increased battery drain required to perform those computational tasks on the devices. Further, while the device charger performs computational tasks for the trusted devices, it also may provide charging functions to the devices that are physically connected to the device charger.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards, such as defined by the IEEE 802.11-2020 specification or amendments thereof (including, but not limited to, 802.11ay, 802.11ax (also referred to as Wi-Fi 6), 802.11az, 802.11ba, 802.11bc, 802.11bd, 802.11be (also referred to as Wi-Fi 7), 802.11bf, and 802.11bn (also referred to as Wi-Fi 8)) or other WLAN or Wi-Fi standards, such as that associated with the Integrated Millimeter Wave (IMMW) study group. In some other examples, the wireless communication network 100 can be an example of a cellular radio access network (RAN), such as a 5G or 6G RAN that implements one or more cellular protocols, such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices, including a wireless access point (AP) 102 and any number of wireless stations (STAs) 104. While only one AP 102 is shown in FIG. 1, the wireless communication network 100 can include multiple APs 102 (for example, in an extended service set (ESS) deployment, enterprise network, or AP mesh network), or may not include any AP at all (for example, in an independent basic service set (IBSS) such as a peer-to-peer (P2P) network or other ad hoc network). The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as an infrastructure basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network character-istics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tun-neled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling com-munication with the two or more peripheral devices. Addi-tionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is trans-mitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless com-munication protocol to be used to transmit the payload.

The APs 102 and STAs 104 in the wireless communica-tion network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communica-tions. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchan-nels). The terms "channel" and "subchannel" may be used interchangeably herein, as each may refer to a portion of frequency spectrum within a frequency band (for example, a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (for example, for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and con-tending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (for example, UHR- or IEEE 802.11bn-compatible) devices for opportunistic access to spectrum that may be otherwise under-utilized.

Figure 2:
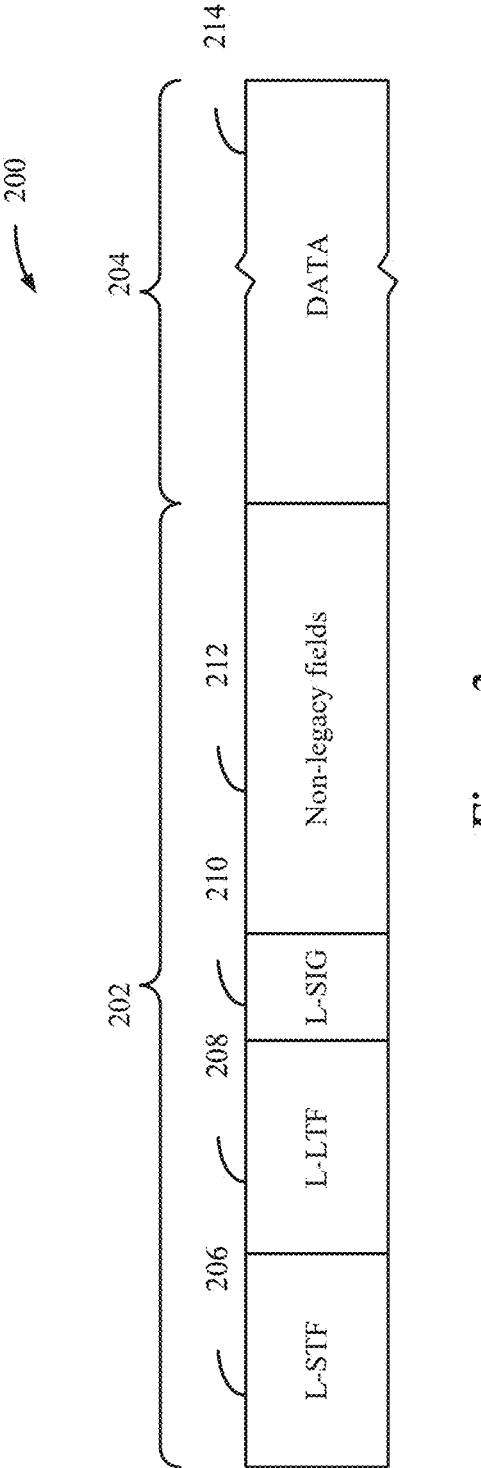
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (for example, by generating a message integrity check (MIC) for one or more relevant fields).

Figure 3:
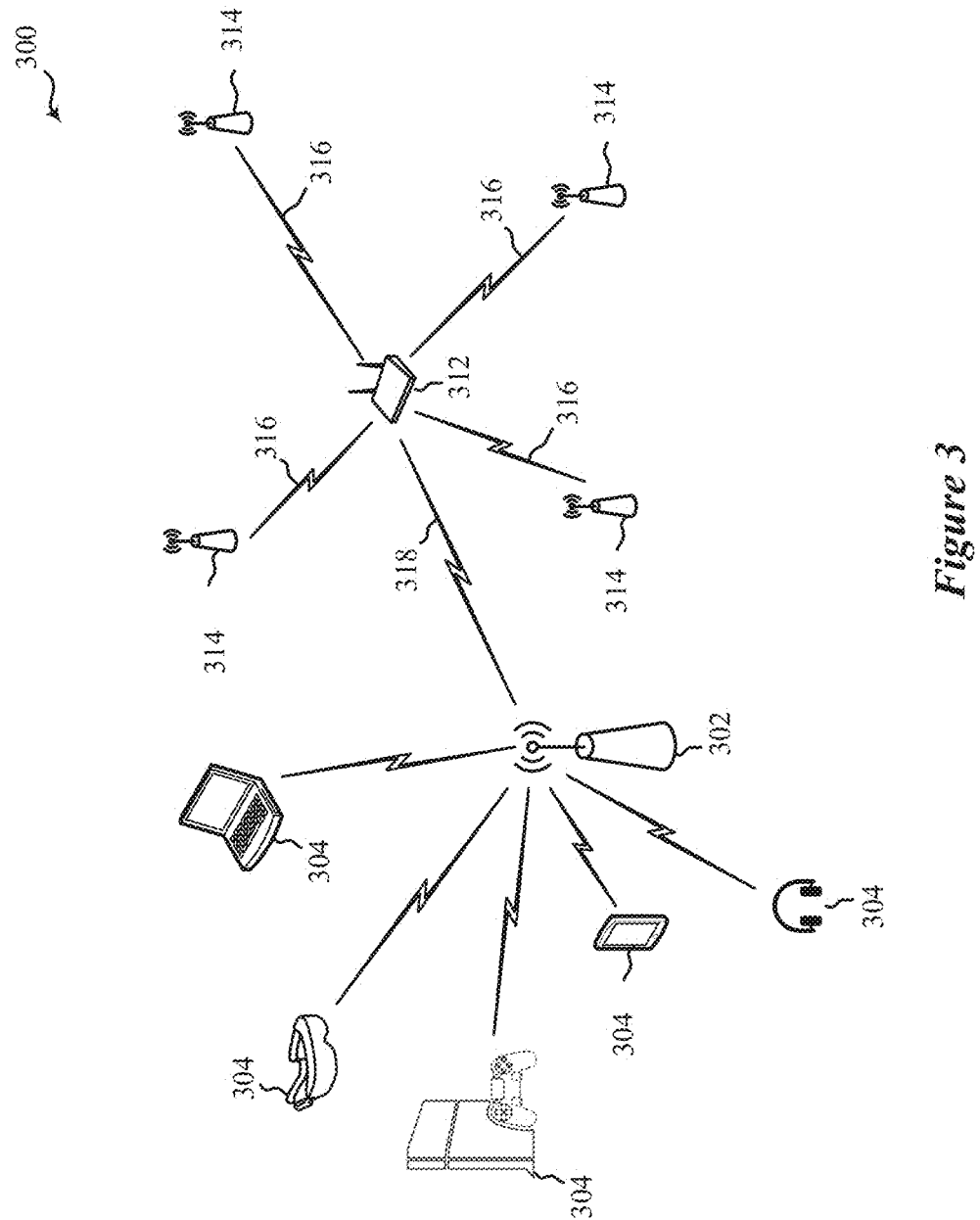
FIG. 3 shows a pictorial diagram of another example wireless communication network.

FIG. 3 shows a pictorial diagram of another example wireless communication network 300. According to some aspects, the wireless communication network 300 can be an example of a mesh network, an IoT network or a sensor network in accordance with one or more of the IEEE 802.11 family of wireless communication protocol standards (including the 802.11ah amendment). The wireless communication network 300 may include multiple wireless communication devices 314, which in some implementations may include APs 302, STAs 304, or both. The wireless communication devices 314 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 314 sense, measure, collect or otherwise obtain and process data and transmit such raw or processed data to an intermediate device 312 for subsequent processing or distribution. Additionally, or alternatively, the intermediate device 312 may transmit control information, digital content (for example, audio or video data), configuration information or other instructions to the wireless communication devices 314. The intermediate device 312 and the wireless communication devices 314 can communicate with one another via wireless communication links 316. In some examples, the wireless communication links 316 include Bluetooth links, or other PAN or short-range communication links.

In some examples, the intermediate device 312 also may be configured for wireless communication with other networks such as with a WLAN or a wireless (for example, cellular) wide area network (WWAN), which may, in turn, provide access to external networks including the Internet. For example, the intermediate device 312 may associate and communicate, over a Wi-Fi link 318, with an AP 302 of a wireless communication network 300, which also may serve various STAs 304. In some examples, the intermediate device 312 is an example of a network gateway, for example, an IoT gateway. In such a manner, the intermediate device 312 may serve as an edge network bridge providing a Wi-Fi core backhaul for the IoT network including the wireless communication devices 314. In some examples, the intermediate device 312 can analyze, preprocess and aggregate data received from the wireless communication devices 314 locally at the edge before transmitting it to other devices or external networks via the Wi-Fi link 318. The intermediate device 312 also can provide additional security for the IoT network and the data it transports.

Figure 4:
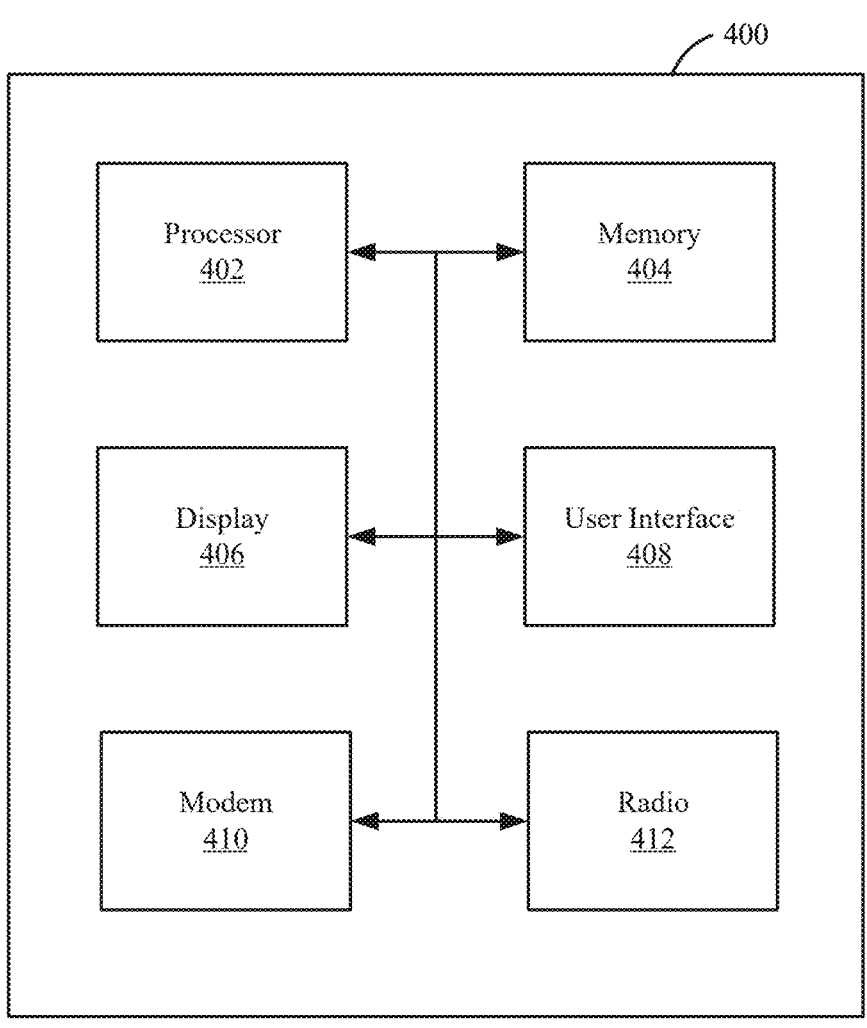
FIG. 4 shows a block diagram of an example wireless communication device that supports task offloading onto a wireless communication device charger in a secure device ecosystem.

FIG. 4 shows a block diagram of an example wireless communication device 400 that supports task offloading onto a wireless communication device charger in a secure device ecosystem. In some examples, the wireless communication device 400 is configured to perform the processes 900 and 1000 described with reference to FIGS. 9 and 10, respectively. The wireless communication device 400 may include one or more chips, SoCs, chipsets, packages, components, or devices that individually or collectively constitute or include a processing system. The processing system may interface with other components of the wireless communication device 400, and may generally process information (such as inputs or signals) received from such other components and output information (such as outputs or signals) to such other components. In some aspects, an example chip may include a processing system, a first interface to output or transmit information, and a second interface to receive or obtain information. For example, the first interface may refer to an interface between the processing system of the chip and a transmission component, such that the device 400 may transmit the information output from the chip. In such an example, the second interface may refer to an interface between the processing system of the chip and a reception component, such that the device 400 may receive information that is passed to the processing system. In some such examples, the first interface also may obtain information, such as from the transmission component, and the second interface also may output information, such as to the reception component.

The processing system includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements, or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains, or multiple transceivers, each of which may, in turn be coupled with one or more of multiple antennas. In some implementations, one or more processors of the processing system include or implement one or more of the radios, RF chains or transceivers.

In some examples, the wireless communication device 400 can be configurable or configured for use in a STA, such as the STA 104 described with reference to FIG. 1. In some other examples, the wireless communication device 400 can be a STA that includes such a processing system and other components, including multiple antennas. The wireless communication device 400 is capable of transmitting and receiving wireless communications in the form of, for example, wireless packets. For example, the wireless communication device 400 can be configurable or configured to transmit and receive packets in the form of physical layer PPDUs and MPDUs conforming to one or more of the IEEE 802.11 family of wireless communication protocol standards. In some other examples, the wireless communication device 400 can be configurable or configured to transmit and receive signals and communications conforming to one or more 3GPP specifications including those for 5G NR or 6G. In some examples, the wireless communication device 400 also includes or can be coupled with one or more application processors which may be further coupled with one or more other memories. In some examples, the wireless communication device 400 further includes a user interface (UI) (such as a touchscreen or keypad) and a display, which may be integrated with the UI to form a touchscreen display that is coupled with the processing system. In some examples, the wireless communication device 400 may further include one or more sensors, such as, for example, one or more inertial sensors, accelerometers, temperature sensors, pressure sensors, or altitude sensors, that are coupled with the processing system.

The wireless communication device 400 includes a processor 402, a memory 404, a display 406, a user interface 408, a modem 410, and a radio 412. Portions of one or more of the components (406, 408, 410, and 412) may be implemented at least in part in hardware or firmware. In some examples, at least some of the components (406, 408, 410, and 412) of the device 400 are implemented at least in part by a processor and as software stored in a memory. For example, portions of one or more of the display 406, the user interface 408, and the modem 410 can be implemented as non-transitory instructions (or "code") executable by the processor 402 to perform the functions or operations of the respective module.

In some implementations, the processor 402 may be a component of a processing system. A processing system may generally refer to a system or series of machines or components that receives inputs and processes the inputs to produce a set of outputs (which may be passed to other systems or components of, for example, the device 400). For example, a processing system of the device 400 may refer to a system including the various other components or sub-components of the device 400, such as the processor, a transceiver, a communications manager, or other components or combinations of components of the device 400. The processing system of the device 400 may interface with other components of the device 400 and may process information received from other components (such as inputs or signals) or output information to other components. For example, a chip or modem of the device 400 may include a processing system, a first interface to output information, and a second interface to obtain information. In some implementations, the first interface may refer to an interface between the processing system of the chip or modem and a transmitter, such that the device 400 may transmit information output from the chip or modem. In some implementations, the second interface may refer to an interface between the processing system of the chip or modem and a receiver, such that the device 400 may obtain information or signal inputs, and the information may be passed to the processing system. A person having ordinary skill in the art will readily recognize that the first interface also may obtain information or signal inputs, and the second interface also may output information or signal outputs.

The processor 402 is capable of, configured to, or operable to process information received through the radio 412 and the modem 410, and processes information to be output through the modem 410 and the radio 412 for transmission through the wireless medium. The processor 402 may perform logical and arithmetic operations using program instructions stored within the memory 404. The instructions in the memory 404 may be executable (by the processor 402, for example) to implement the methods described herein. In some examples, the processor 402, together with the memory 404, is capable of or configured to facilitate detecting a connection with a wireless communication device charger, transmitting an authentication request to the wireless communication device charger, receiving an authentication response from the wireless communication device charger, authenticating the response, transmitting a task offload policy to the wireless communication device charger, and offloading tasks within the task offload policy and associated with the wireless communication device to the wireless communication device charger.

The memory 404 is capable of, configured to, or operable to store and communicate instructions and data to and from the processor 402.

The user interface 408 may be any device that allows a user to interact with the wireless communication device 400, such as a keyboard, a mouse, a microphone, et cetera. In aspects, the user interface 408 may be integrated with the display component 406 to present a touchscreen.

The modem 410 is capable of, configured to, or operable to modulate packets and to output the modulated packets to the radio 412 for transmission over the wireless medium. The modem 410 is similarly configured to obtain modulated packets received by the radio 412 and to demodulate the packets to provide demodulated packets.

The radio 412 includes at least one radio frequency transmitter and at least one radio frequency receiver, which may be combined into one or more transceivers. The transmitter(s) and receiver(s) may be coupled to one or more antennas. In some aspects, the processor 402, the memory 404, the modem 410, and the radio 412 may collectively facilitate the wireless communication of the wireless communication device 400 with other wireless communication devices over multiple frequency bands (such as 2.4 GHz, 5 GHz, or 6 GHz).

Figure 5:
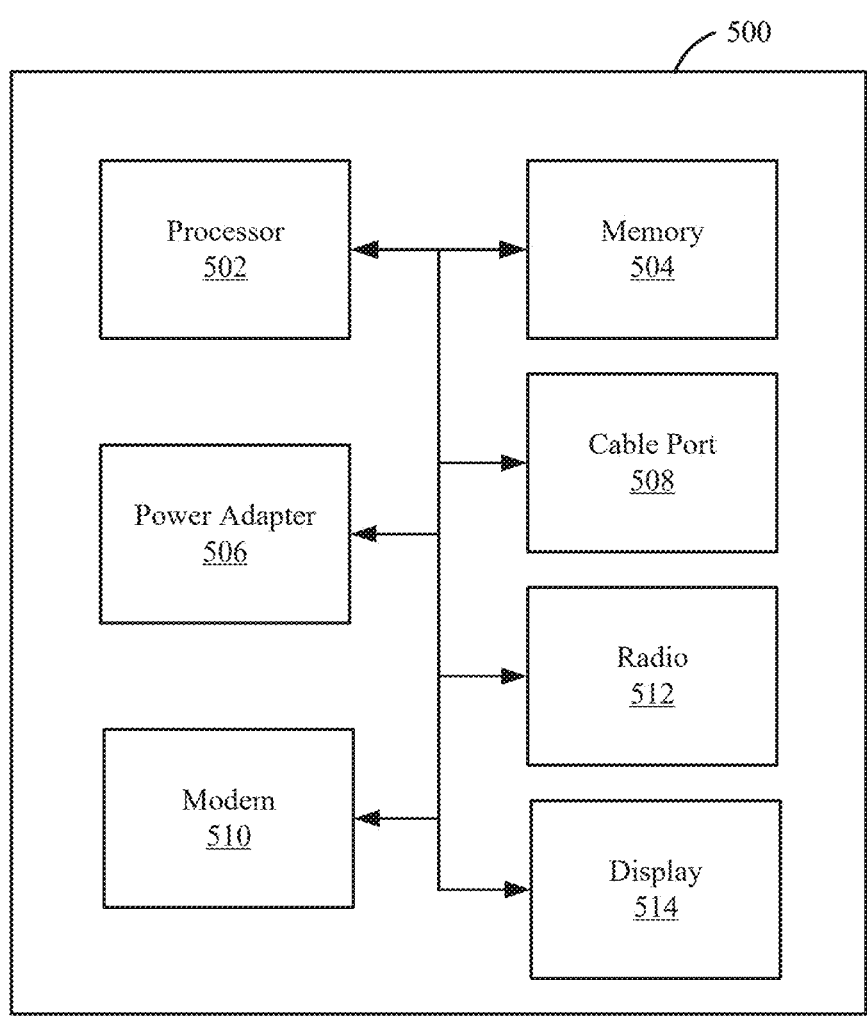
FIG. 5 shows a block diagram of an example wireless communication device charger that supports performing tasks offloaded from a wireless communication device in a secure device ecosystem.

FIG. 5 shows a block diagram of an example wireless communication device charger 500 that supports performing tasks offloaded onto the wireless communication device charger 500 from a wireless communication device in a secure device ecosystem. In some examples, the wireless communication device charger 500 is configured to perform the process 800 described with reference to FIG. 8.

In some examples, the wireless communication device charger 500 is context-aware by receiving context states from devices within a secure device ecosystem. A context state may refer to the condition, or state, of an identity at a point in time. An identity may include a user, a device, or an application. For example, the context state of a device may include device activity such as wake-up times, sensor data, running applications, malware detection, and diagnostic information. Device context states also may include health states of devices, such as tracking factors like storage availability, memory usage, processor usage, and wear and tear of the device. Context states also may include user states that include information collected from sensors associated with the user, such as heart rate, blood pressure, recent activities performed, and screen time. Trusted devices within the secure device ecosystem, and in proximity to each other, can communicate their active context state such that the other trusted devices maintain a context awareness of each trusted device.

In some implementations, context awareness enables the wireless communication device charger 500 to detect, understand, and act upon various factors in its environment. For instance, as context states are shared amongst trusted devices within the secure device ecosystem, the wireless communication device charger 500 may leverage that information to determine what tasks associated with the devices can be offloaded onto the device charger 500. The wireless communication device charger 500 can perform computations associated with the offloaded task and transmit information from the computations back to the respective device. For instance, if a device transmits a context state associated with overheating, the wireless communication device charger 500 may perform tasks for the overheating device to relieve the computational stress on the device. Offloading the task onto the wireless communication device charger 500 reduces the load on the device and lowers its heat output. In another example, a device may transmit a context state indicating its internal storage is full, the wireless communication device charger 500 may perform tasks to upload locally stored information on the device to a remote storage location such as cloud storage.

The wireless communication device charger 500 may include one or more chips, SoCs, chipsets, packages, components, or devices that individually or collectively constitute or include a processing system. The processing system may interface with other components of the wireless communication device charger 500, and may generally process information (such as inputs or signals) received from such other components and output information (such as outputs or signals) to such other components. In some aspects, an example chip may include a processing system, a first interface to output or transmit information, and a second interface to receive or obtain information. For example, the first interface may refer to an interface between the processing system of the chip and a transmission component, such that the wireless communication device charger 500 may transmit the information output from the chip. In such an example, the second interface may refer to an interface between the processing system of the chip and a reception component, such that the wireless communication device charger 500 may receive information that is passed to the processing system. In some such examples, the first interface also may obtain information, such as from the transmission component, and the second interface also may output information, such as to the reception component.

The processing system includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements, or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains, or multiple transceivers, each of which may, in turn, be coupled with one or more of multiple antennas. In some implementations, one or more processors of the processing system include or implement one or more of the radios, RF chains or transceivers.

The wireless communication device charger 500 is capable of transmitting and receiving wireless communications in the form of, for example, wireless packets. For example, the wireless communication device charger 500 can be configurable or configured to transmit and receive packets in the form of physical layer PPDUs and MPDUs conforming to one or more of the IEEE 802.11 family of wireless communication protocol standards. In some other examples, the wireless communication device charger 500 can be configurable or configured to transmit and receive signals and communications conforming to one or more 3GPP specifications, including those for 5G NR or 6G. In some examples, the wireless communication device charger 500 also includes or can be coupled with one or more application processors which may be further coupled with one or more other memories.

The wireless communication device charger 500 includes a processor 502, a memory 504, a power adapter 506, a cable port 508, a modem 510, a radio 512, and a display 514. Portions of one or more of the components (506, 508, 510, 512, and 514) may be implemented at least in part in hardware or firmware. In some examples, at least some of the components f in a memory. For example, portions of one or more of the power adapter 506 and the modem component 510 can be implemented as non-transitory instructions (or "code") executable by the processor 502 to perform the functions or operations of the respective module.

In some implementations, the processor 502 may be a component of a processing system. A processing system may generally refer to a system or series of machines or components that receives inputs and processes the inputs to produce a set of outputs (which may be passed to other systems or components of, for example, the wireless communication device charger 500). For example, a processing system of the wireless communication device charger 500 may refer to a system including the various other components or subcomponents of the wireless communication device charger 500, such as the processor, a transceiver, or a communications manager, or other components or combinations of components of the wireless communication device charger 500. The processing system of the wireless communication device charger 500 may interface with other components of the wireless communication device charger

500 and may process information received from other components (such as inputs or signals) or output information to other components. For example, a chip or modem of the wireless communication device charger 500 may include a processing system, a first interface to output information, and a second interface to obtain information. In some implementations, the first interface may refer to an interface between the processing system of the chip or modem and a transmitter, such that the wireless communication device charger 500 may transmit information output from the chip or modem. In some implementations, the second interface may refer to an interface between the processing system of the chip or modem and a receiver, such that the wireless communication device charger 500 may obtain information or signal inputs, and the information may be passed to the processing system. A person having ordinary skill in the art will readily recognize that the first interface also may obtain information or signal inputs, and the second interface also may output information or signal outputs.

The processor 502 is capable of, configured to, or operable to process information received through the radio 512 and the modem 510, and processes information to be output through the modem 510 and the radio 512 for transmission through the wireless medium. The processor 502 may perform logical and arithmetic operations using program instructions stored within the memory 504. The instructions in the memory 504 may be executable (by the processor 502, for example) to implement the methods described herein. In some examples, the processor 502, together with the memory 504, is capable of or configured to facilitate detecting a connection with a wireless communication device, receiving an authentication request associated with a secure device ecosystem from the device, transmitting an authentication response to the device, receiving a task from the device via the secure device ecosystem, performing computations associated with the task, and transmitting information associated with the computations from the wireless communication device charger to the device.

The memory 504 is capable of, configured to, or operable to store and communicate instructions and data to and from the processor 502.

The power adapter 506 is capable of, configured to, or operable to convert and condition electricity from an electrical outlet into a form that can be safely used to charge a device. In some implementations, the power adapter 506 includes a transformer, rectifier, filter capacitor, voltage regulator, control circuitry, and safety mechanisms. For instance, the primary role of the transformer is to step down the voltage from the AC mains power to a lower voltage that is suitable for the device being charged. The transformer can include two sets of coils or windings (primary and secondary) that are wrapped around a magnetic core. The voltage is adjusted by changing the ratio of turns between the primary and secondary coils.

In some aspects, the power adapter 506 implements the USB Power Delivery (USB-PD) protocol. The USB-PD is a protocol that allows devices to negotiate power delivery over a USB connection. This standard supports higher power and allows devices to request just the right amount of power they need for charging.

In some aspects, the power adapter 506 implements a transmitter coil through which an alternating current flows. The alternating current creates a dynamic magnetic field around the coil. When a device with a receiver coil is placed near the transmitter coil, the magnetic field induces a voltage across the receiver coil, which can then be used to charge the device's battery.

The cable port 508 is capable of, configured to, or operable to serve as the physical interface between the wireless communication device charger 500 and a device. The cable port 508 can vary based on the standard and type of connector used. These types include, but are not limited to, USB Type-A, USB Type-C, Lightning Connector, Micro-USB, and the like. In addition to providing an interface between the wireless communication device charger 500 and a device, the cable port also may facilitate the charging of the device via the power adapter 506. In aspects, the cable port 508 also supports data transfer between the wireless communication device charger 500 and a device.

The modem 510 is capable of, configured to, or operable to modulate packets and to output the modulated packets to the radio 512 for transmission over the wireless medium. The modem 510 is similarly configured to obtain modulated packets received by the radio 512 and to demodulate the packets to provide demodulated packets.

The radio 512 includes at least one radio frequency transmitter and at least one radio frequency receiver, which may be combined into one or more transceivers. The transmitter(s) and receiver(s) may be coupled to one or more antennas. In some aspects, the processor 502, the memory 504, the modem 510, and the radio 512 may collectively facilitate the wireless communication of the wireless communication device charger 500 with other wireless communication devices over multiple frequency bands (such as 2.4 GHz, 5 GHz, or 6 GHz).

The display 514 may display an interface that allows a user to interact with the wireless communication device charger 500. In aspects, the display 514 presents a touchscreen, allowing the user to directly interact with the interface.

Figure 6:
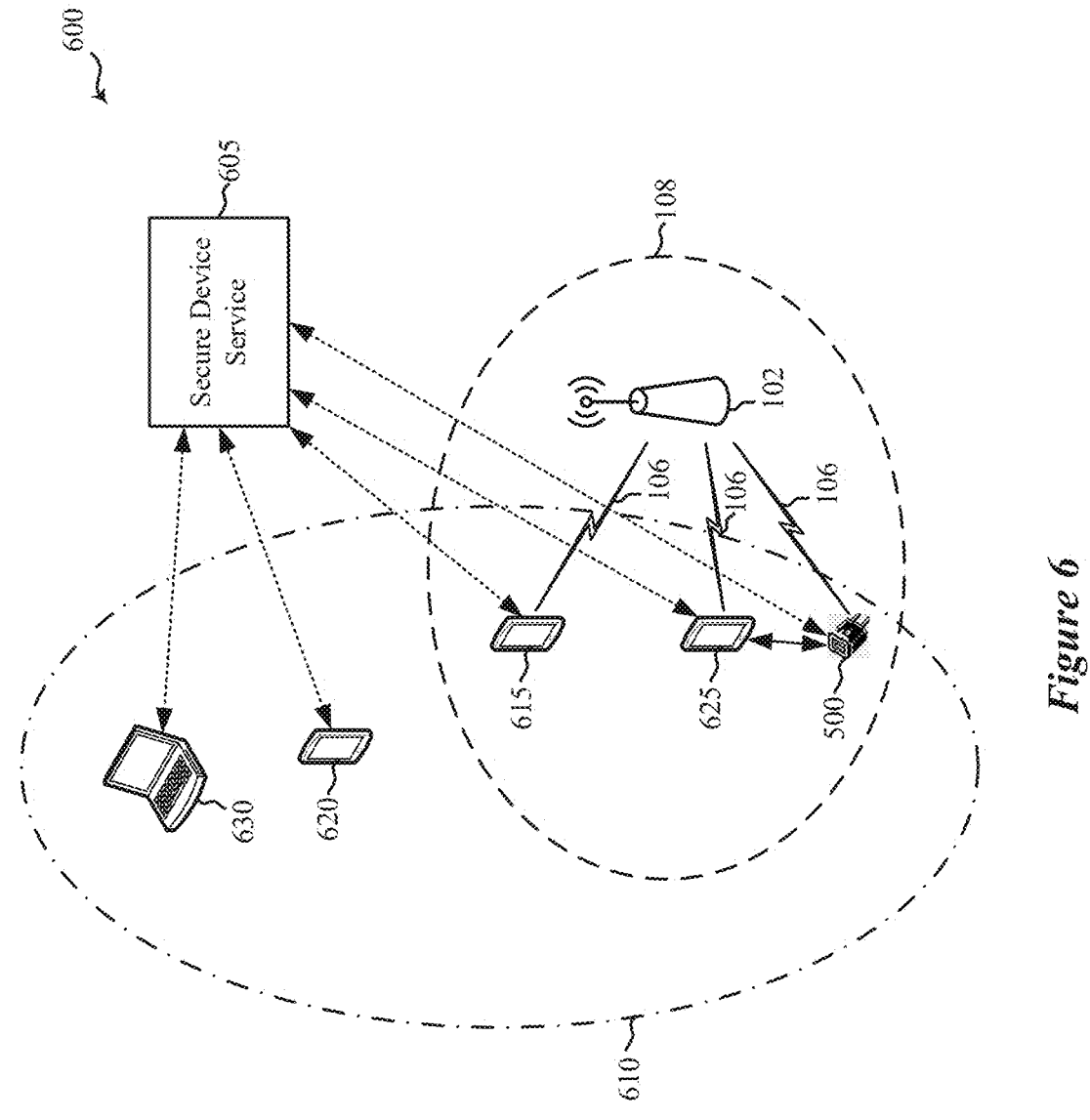
FIG. 6 shows a pictorial diagram of an example secure device ecosystem.

FIG. 6 shows a pictorial diagram of an example secure device ecosystem 600. In some examples, the secure device ecosystem 600 includes secure devices or STAs such as trusted devices 610, which includes secure stations such as STA 615, STA 620, STA 625, STA 630, and a wireless communication device charger 500. In some examples, the STAs 615-630 are similar to the STAs 104. For example, the STAs 615 and 625 may be located in the coverage area 108 and communicate with the AP 102 via communication links 106 as described in further detail in reference to FIG. 1. In some examples, the trusted devices 610 also may include devices outside of a coverage area 108, such as the STA 620 and 630. For example, the STA 620 and 630 may communicate with the secure device service 605 via another wireless network, such as a Wi-Fi, cellular, IoT, or other wireless network. In some examples, the STAs 615-630 also may communicate via communication links 110, also described with reference to FIG. 1. In some examples, communications between the STAs 615-630, the wireless communication device charger 500, and the AP 102 are secure or encrypted communications in the secure device ecosystem 600. These secure or encrypted communications also may occur directly between respective STAs and the wireless communication device charger 500. For example, the STAs and the wireless communication device charger 500 may communicate using secured wireless communication utilizing a security key and encrypted PDU 200, as described in reference to FIG. 2.

In some examples, the STAs 615-630 and the wireless communication device charger 500 are authenticated with a multi-device credential and registered to secure device service 605 and include a unique identification installed on a respective STA or wireless communication device charger 500 indicating the STA or device charger is associated with other devices as well as, including other devices in the secure device ecosystem 600. In some examples, the secure device service 605 is executed on a network device such as a server, AP, such as the AP 102, or other network device in communication with the STAs 615-630 and the wireless communication device charger 500. For example, an independent service or ecosystem controller may authenticate a device, enroll the device or device charger in a secure device service, and install credentials on the device, as shown in more detail in reference to FIG. 7. In some examples, registration of the wireless communication device charger 500 with the secure device service 605 includes a pattern, or code, that can further be used to authenticate the wireless communication device charger 500 in the secure device ecosystem 600. The pattern can take the form of a Personal Identification Number (PIN), password, pattern lock, biometric authentication, security token, one-time password, multi-factor authentication, and the like.

In some examples, the secure STAs, and the wireless communication device charger 500, in the secure device ecosystem 600 may utilize secure communications in the secure device ecosystem 600 to perform a remote authentication credential exchange. In some implementations, the STA 615 registers as a device in the secure device ecosystem during an enrollment or authentication process with the secure device service 605. In some examples, upon authentication and enrollment in the secure device ecosystem 600, the STA 615 generates a remote credential request for a system service on the device and transmits the remote credential request to a wireless communication device charger 500. In some examples, the STA 615 receives an authentication response from the wireless communication device charger 500, which includes remote credential information associated with the system service and the pattern or code associated with the wireless communication device charger 500 in some implementations.

In some examples, once the wireless communication device charger 500 is registered and established as a trusted device within the secure device ecosystem 600, then it can proceed to receive context states from trusted devices within the secure device ecosystem 600, making the wireless communication device charger 500 context-aware. The context states can include task offload policies. In some implementations, the context states include activities associated with the devices. The activities may include application usage, device health, user states, and location. The policies can include a list of tasks associated with the respective device that are permitted to be offloaded onto the device charger. These permitted tasks are use case tasks for the wireless communication device charger that can perform internal computations and then transmit information back to the device over the secure device ecosystem 600.

These use case tasks include tasks such as a backup of files to a remote storage location, such as cloud-based storage, and syncing those files across all the DCF devices based on the task offload policy. In such a use case, the device charger can scan the device for un-synced files stored locally on the device and, upon detection of an un-synced file, can transmit a copy of that file to a remote storage location. Another use case example includes downloading the device update files over a network and transmitting the downloaded update to the device, which gets charged automatically as per the task offload policy. Some additional use case tasks also include diagnostics of the device connected for charging for potential malware, power-consuming activities that may take a longer duration of time to complete to the charging adapter, and download of streaming content over a network.

In some examples, the wireless communication device charger 500 can transmit a context state, including its configuration and computational capabilities. The configuration and computational capabilities may provide the trusted devices in the secure device ecosystem 600 with the capabilities of the wireless communication device charger 500. In some instances, the wireless communication device charger 500 may not be configured to perform all permitted tasks in a task offload policy of a wireless communication device. For example, the wireless communication device charger 500 may not have established a connection with the Internet and may not be able to download information for a trusted device. In such examples, the wireless communication device charger 500 can select only the tasks it can perform, or the trusted device may transmit only tasks that the device charger 500 can perform.

Figure 7:
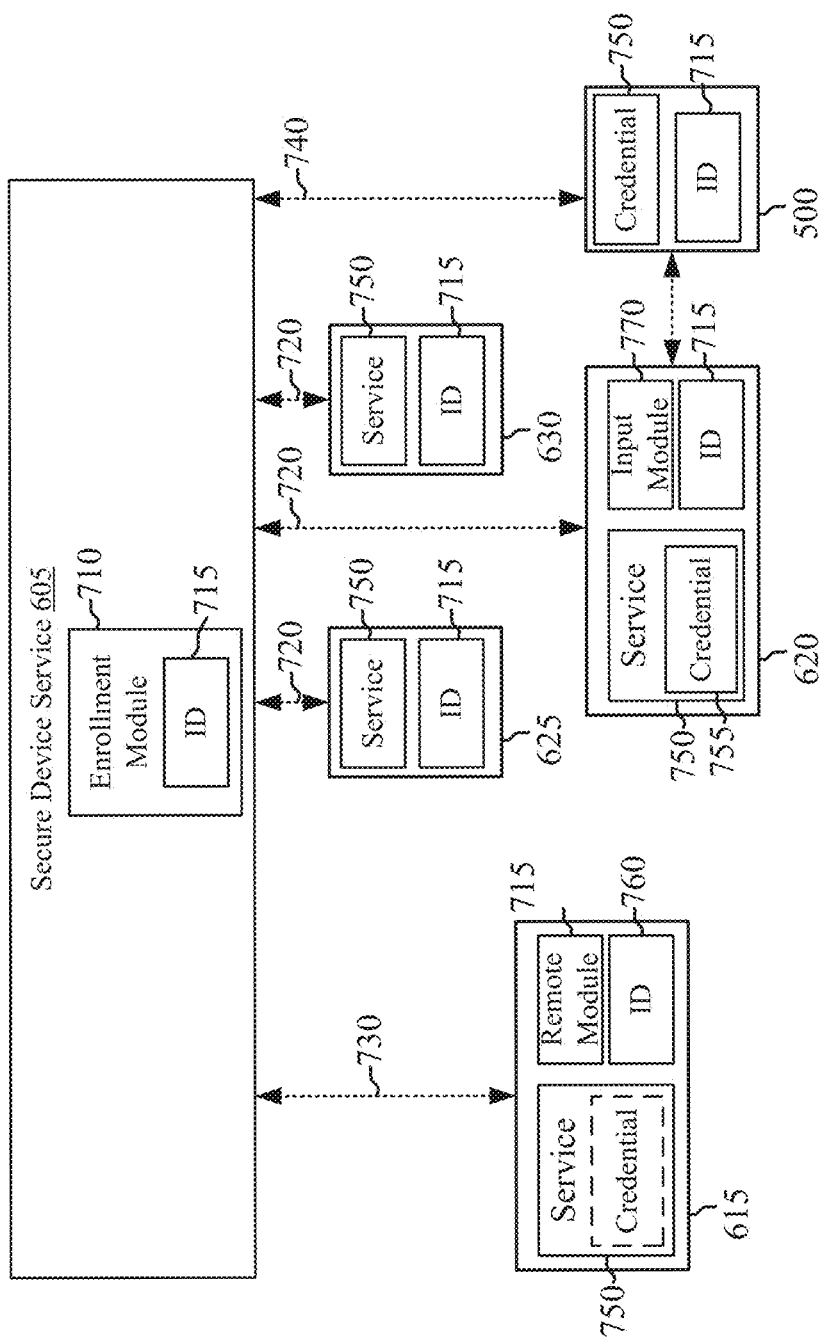
FIG. 7 shows a pictorial diagram of examples of trusted devices in an example secure device ecosystem.

FIG. 7 shows a pictorial diagram of examples of trusted devices in an example secure device ecosystem 600. In some examples, the secure device service 605 includes an enrollment module 710, which provides authentication and credential installation/distribution services to the secure device ecosystem 600. For example, the STA 620, STA 625, and STA 630 may be previously registered in the secure device ecosystem 600 and with the secure device service 605 such that a multi-device ID 715 is installed on each of the STA 620, STA 625 and STA 630. In some examples, the multi-device ID 715 indicates the STAs are authenticated with the secure device service 605 and may serve as a trusted device in the secure device ecosystem 600. In some examples, the STA 620, STA 625, and STA 630 maintain connections 720 to aid in multi-device ID maintenance and re-verification, as well as other control and communication services related to the secure device ecosystem 600.

In some examples, the STA 615 may register with the secure device service 605 as a secure or trusted device using an enrollment process 730. The enrollment process 730 may occur during the initiation or start-up of a device. For example, the first time the STA 615 is turned on or registers a new service or application on the device, the STA 615 initiates the enrollment process to enroll the STA 615 in the secure device ecosystem 600 and with the secure device service 605.

In some examples, the wireless communication device charger 500 may register with the secure device service 605 as a secure or trusted device using the enrollment process 730. The enrollment process 730 may occur during an initial connection with one of the STAs. For example, the wireless communication device charger 500 is connected to STA 620. The STA 620 can then initiate the enrollment process 730 to enroll the wireless communication device charger 500 in the secure device ecosystem 600 and with the secure device service 605. The STA 620 also may provide the secure device service 605 with a pattern or code that can further be used to authenticate the wireless communication device charger 500.

FIG. 8 shows a flowchart illustrating an example process 800 performable by or at a wireless communication device charger that supports performing tasks offloaded onto the wireless communication device charger 500 from a wireless communication device in a secure device ecosystem. The operations of the process 800 may be implemented by a wireless communication device charger or its components as described herein. For example, the process 800 may be performed by the wireless communication device charger 500, described with reference to FIG. 5.

At block 810, the wireless communication device charger detects a connection to a device. In some implementations, the device charger detects the connection using electrical continuity and communication between the charger and the device. For example, a physical connection allows electrical contacts to meet, establish a circuit, and carry power from the charger to the device. Once connected, the device charger can detect the presence of the device by sensing a load on its output voltage. If the output voltage drops slightly when the device is connected, it can indicate that the device is drawing power, confirming a connection.

In some implementations, the device charger has data communication lines (like the D+ and D− lines in USB chargers). These lines can facilitate a handshake or communication protocol between the device and the charger. For example, smartphones can communicate their charging specifications to the charger to ensure they receive the correct amount of power. In some implementations, the device and the charger negotiate the power requirements via these data lines. The device can request a specific voltage and current level, and the charger confirms whether it can supply that specific request.

At block 820, the device charger receives an authentication request associated with a secure device ecosystem. The authentication request can include a request from the device to the device charger to verify the identity of the device charger and to ensure that the device charger is associated with the same secure device ecosystem as the device. The authentication request can be a remote credential request to the device charger.

At block 830, the device charger transmits an authentication response, which includes remote credential information associated with the secure device ecosystem. In some examples, the authentication response may include encrypted information, which the receiving device can decrypt. At the remote authentication service module, the authentication response parses the remote credential information from the encrypted message. In some implementations, the authentication response also may include a pattern or code that can further be used to authenticate the device charger in the secure device ecosystem.

In some implementations, the device charger is required to transmit the authentication response within a time window. The time window can be a fixed or dynamic duration that defines how long a response is considered valid and secure after a request is made. The purpose of this window is to limit the opportunity for attackers to intercept and reuse valid data, such as tokens or passwords. The time window also helps in ensuring that responses are timely and reflect the current state of the system. Implementing time windows can enhance security by limiting the temporal validity of any single operation.

In some implementations, the authentication response is encrypted using an encryption method known by trusted devices within the secure device ecosystem. Upon receiving the encrypted response, the trusted device decrypts it using the appropriate decryption key. The trusted device can then verify the contents of the response. After decryption, the trusted device checks the validity of the authentication response, the correctness of the credentials, and any other included authentication data, such as a pattern or code.

At block 840, if the authentication response does not verify that the device charger is associated with the same secure device ecosystem as the connected device, then the device charger initiates a charge to the battery of the device that corresponds with the correct power requirements identified by the device when the connection was established.

At block 850, if the authentication response verifies that the device charger is associated with the same secure device ecosystem as the connected device, then the device charger receives a context state associated with the device across the secure device ecosystem. The context state can include an activity requiring tasks to be performed to accomplish the task.

In some implementations, the context state includes a task configuration associated with the device. The task configuration can include a list of tasks that the device has designated as being allowable to be offloaded to the device charger. Use cases, for example, include downloading streaming content occurring on the device charger and transferring it to the device, internet connectivity through the device charger, downloading device updates, data backups, diagnostics, and the like.

At block 860, the device charger performs computations associated with the task provided in the context state. The computations can vary based on the use case task the device is performing. For instance, if the use case task is to download updates associated with the device, then the device charger can initiate a download of the update over a network the device charger is connected to. In another instance, the device charger may scan the files stored in memory on the device and then transmit the files that require uploading to a remote storage location associated with the device. For example, photographs that were taken on the device and stored in cloud-based storage.

At block 870, the device charger transmits information associated with the computations to the device. The information, as with the computations, can vary based on the use case task the device is performing. The information can include data downloaded over a network and transferred onto the device, such as downloaded updates or streaming packets. The information also can include an indication to the device that the use case task has been performed such as in use cases when the device charger uploads files to a remote storage location.

In some examples, the STA 615 receives an authentication response from the target device, which includes remote credential information associated with the system service and, in some implementations, the pattern or code, associated with the wireless communication device charger 500.

FIG. 9 shows a flowchart illustrating an example process 900 performable by or at a wireless STA that supports task offloading onto a wireless communication device charger in a secure device ecosystem. The operations of the process 900 may be implemented by a wireless STA or its components as described herein. For example, the process 900 may be performed by a wireless communication device, such as the wireless communication device 400 described with reference to FIG. 4, operating as or within a wireless STA. In some examples, the process 900 may be performed by a wireless STA such as one of the STAs 104 described with reference to FIG. 1 by the STA 625 described in reference to FIGS. 6 and 7.

At block 910, the wireless communication device detects a connection to a wireless communication device charger. The wireless communication device can detect a connection with the device through several means, including physical detection of the connection, voltage detection, current sensing, communication protocol engagement, charger type identification, and impedance and resistance checks. For instance, wireless communication device and the device charger can communicate with each other using specific protocols. For example, USB devices use the USB Power Delivery (USB-PD) protocol or via Qualcomm Quick Charge. In another example, the wireless communication device and the device charger establish a connection via a wireless charging pad associated with the wireless communication device charger.

Upon establishing the connection, the wireless communication device and the device charger exchange information associated with how much power the device charger can deliver and how much power the wireless communication device can accept.

At block 920, the wireless communication device transmits an authentication request associated with a secure device ecosystem. The authentication request can include a request from the device to the device charger to verify the identity of the device charger and to ensure that the device charger is associated with the same secure device ecosystem as the device. The authentication request can be a remote credential request to the device charger.

At block 930, the wireless communication device receives an authentication response, including remote credential information associated with the secure device ecosystem. In some examples, the authentication response may include encrypted information, which the wireless communication device can decrypt. The authentication response parses the remote credential information from the encrypted message at the remote authentication service module. In some implementations, the authentication response also may include a pattern or code to further authenticate the device charger in the secure device ecosystem.

At block 940, if the authentication response does not verify that the device charger is associated with the same secure device ecosystem as the wireless communication device, then the process 900 proceeds to block 950. At block 950, the wireless communication device prohibits data exchange from occurring between the device and the device charger. In some implementations, if a physical connection exists between the wireless communication device and the device charger, then the device can disable the data transfer pins while leaving the power pins active. This allows the device to be charged without transferring data. In some implementations, the wireless communication device can utilize a device configuration profile that can restrict the device's ability to communicate over a physical connection interface other than charging. At block 960, the device initiates a charge of a battery associated with the device.

Referring to block 940, if the authentication response verifies that the device charger is associated with the same secure device ecosystem as the wireless communication device, then the process 900 proceeds to block 970. At block 970, the wireless communication device transmits a task offload policy to the device charger. The task offload policy, as described, can define the use case tasks that can be offloaded onto the device charger.

At block 980, the wireless communication device offloads a task within the task offload policy. In some implementations, the wireless communication device segments or identifies specific components of a task that can be offloaded to the device charger. This can depend on the nature of the task and the capabilities of the device charger. In some implementations, the wireless communication device requests a compatibility check from the device charger. The compatibility check can ensure that the device charger receiving the task is compatible with the execution requirements to perform the task. The compatibility check can include hardware capabilities, software requirements, necessary libraries, or frameworks to perform the task, and the like.

In some implementations, the wireless communication device transmits data associated with the task, including instructions for completing the task. The data and instructions can include sending input data, execution parameters, and any relevant metadata. In some implementations, the data and tasks are transmitted via the secure device ecosystem and are secure or encrypted to prevent interception or tampering.

In some implementations, the wireless communication device monitors the progress of the offloaded task. Depending on the complexity and duration of the task, the wireless communication device may monitor the progress of the task to ensure that the task is accomplished according to necessary requirements. Monitoring can include receiving periodic status updates from the device charger.

In some implementations, the wireless communication device receives information from the device charger. The information can include an indication that the task is completed, the results of the computation, error messages, or requests for additional data or parameters. In instances where an error has occurred, the wireless communication device can implement error handling and failover mechanisms. The error handling can include requesting that the device charger retry performing the task, offloading the task to a different device within the ecosystem, or taking over the task completion itself.

In some implementations, the information received from the device charger includes corresponding data. Once the task is completed, the wireless communication device can integrate the received data into its ongoing processes. This can include performing further computations, adjustments based on the results, or user notifications.

FIG. 10 shows a flowchart illustrating an example process 1000 performable by or at a wireless STA that supports registering a wireless communication device charger in a secure device ecosystem. The operations of the process 1000 may be implemented by a wireless STA or its components as described herein. For example, the process 1000 may be performed by a wireless communication device, such as the wireless communication device 400 described with reference to FIG. 4, operating as or within a wireless STA. In some examples, the process 1000 may be performed by a wireless STA such as one of the STAs 104 described with reference to FIG. 1 by the STA 625 described in reference to FIGS. 6 and 7.

At block 1010, the wireless communication device detects a connection to a wireless communication device charger. The wireless communication device can detect a connection with the device through several means, including physical detection of the connection, voltage detection, current sensing, communication protocol engagement, charger type identification, and impedance and resistance checks. For instance, a wireless communication device and the device charger can communicate with each other using specific protocols. For example, USB devices use the USB Power Delivery (USB-PD) protocol or via Qualcomm Quick Charge. Upon establishing the connection, the wireless communication device and the device charger exchange information associated with how much power the device charger can deliver and how much power the wireless communication device can accept.

At block 1020, the wireless communication device initiates a registration of the device charger in a secure device ecosystem, where the wireless communication device is authenticated with an ID associated with the secure device ecosystem. In some implementations, registering the device charger in the secure device ecosystem also may include initiating a remote authentication service module on the wireless communication device and selecting, during an initiation process for the device charger and via the remote authentication service module, a pattern or code associated with the device charger. In some examples, the selection of the pattern or code associated with the device charger is based on an ability to provide additional security beyond the ID associated with the secure device ecosystem.

In some examples, the wireless communication device may register the device charger with the secure device service as a secure or trusted device using an enrollment process. The enrollment process may occur during the initiation or start-up of the device charger. For example, the first time the device charger is turned on and connected to a device, the wireless communication device initiates the enrollment process to enroll the device charger in the secure device ecosystem and with the secure device service.

At block 1030, the wireless communication device transmits credentials to an enrollment module of the secure device service, which authenticates the credentials in the secure device ecosystem. The credentials indicate the wireless communication device is authenticated with the secure device service and may serve as a trusted device in the secure device ecosystem. In some examples, the wireless communication device maintains a connection with other trusted devices within the secure device ecosystem.

At block 1040, once authenticated by the enrollment module, the wireless communication device associates the device charger with the credentials associated with trusted devices within the secure device ecosystem. At block 1050, the wireless communication device also may receive a pattern or code unique to the device charger that provides additional verification that the device charger is associated with the secure device ecosystem and is a trusted device. At block 1060, the wireless communication device associates the device charger with the pattern or code in addition to the credentials provided to the trusted device in the secure device ecosystem.

Implementation examples are described in the following numbered clauses:

Clause 1. A method for task offloading by a device charger, including: receiving, at a device charger, a context state from a trusted device within a secure device ecosystem with the device charger, where the context state includes a task associated with the trusted device; performing, at the device charger, computations associated with the task; and transmitting information associated with the computations from the device charger to the trusted device.

Clause 2. The method of clause 1, further including: retrieving, prior to performing the computations, computational capabilities of the device charger; and verifying the computational capabilities of the device charger to perform the task.

Clause 3. The method of any of clauses 1 or 2, where performing the computations associated with the task further includes: transmitting, from the device charger, data associated with the task over a network; receiving corresponding data from the network; and transmitting the corresponding data from the device charger to the trusted device.

Clause 4. The method of any of clauses 1, 2, or 3, where performing the computations associated with the task further includes: receiving, from the trusted device, at least one file stored in memory on the trusted device;

and transmitting, over a network, the at least one file to a remote storage location associated with the trusted device.

Clause 5. The method of any of clauses 1, 2, 3, or 4, where performing the computation associated with the task further includes: scanning files, by the device charger, stored in memory on the trusted device; detecting an un-synced file from the files; and transmitting, over a network, the un-synced file to a remote storage location associated with the trusted device.

Clause 6. The method of any of clauses 1, 2, 3, 4, or 5, further including: connecting the device charger with the trusted device; analyzing a charge capability of a battery associated with trusted device; and charging, by the device charger, the battery according to the charge capability of the battery over the connection.

Clause 7. The method of any of clauses 1, 2, 3, 4, 5, or 6, further including: receiving, from the trusted device, a remote credential request for authentication associated with the secure device ecosystem; and transmitting, from the device charger, credentials associated with the secure device ecosystem including a pattern to the trusted device, where the pattern is registered with the device charger in the secure device ecosystem.

Clause 8. The method of any of clauses 1, 2, 3, 4, 5, 6, or 7, further including: receiving, from the trusted device, a remote credential request for authentication with the secure device ecosystem; and transmitting, from the device charger, credentials associated with the secure device ecosystem and registered with the device charger.

Clause 9. The method of any of clauses 1, 2, 3, 4, 5, 6, 7, or 8, where the device charger transmits the credentials within a time window.

Clause 10. The method of any of clauses 1, 2, 3, 4, 5, 6, 7, 8, or 9, where the credentials are encrypted prior to transmission.

Clause 11. A device charger for task offloading from a device, including: a processing system that includes one or more processors and one or more memories coupled with the one or more processors, the processing system configured to cause the device charger to: receive a context state from a trusted device within a secure device ecosystem with the device charger, where the context state includes a task associated with the trusted device; perform computations associated with the task; and transmit information associated with the computations from the device charger to the trusted device.

Clause 12. The device charger of any of clauses 11, the processing system further configured to cause the device charger to: retrieve, prior to performing the computations, computational capabilities of the device charger; and verify the computational capabilities of the device charger to perform the task.

Clause 13. The device charger of any of clauses 11 or 12, where performing the computations associated with the task cause the device charger to: transmit data associated with the task over a network; receive corresponding data from the network; and transmit the corresponding data from the device charger to the trusted device.

Clause 14. The device charger of any of clauses 11, 12, or 13, where performing the computations associated with the task cause the device charger to: receive, from the trusted device, at least one file stored in memory on the trusted device; and transmit, over a network, the at least one file to a remote storage location associated with the trusted device.

Clause 15. The device charger of any of clauses 11, 12, 13, or 14, where performing the computations associated with the task cause the device charger to: scan files, by the device charger, stored in memory on the trusted device; detect an un-synced file from the files; and transmit, over a network, the un-synced file to a remote storage location associated with the trusted device.

Clause 16. The device charger of any of clauses 11, 12, 13, 14, or 15, the processing system further configured to cause the device charger to: connect the device charger with the trusted device; analyze a charge capability of a battery associated with the trusted device; and charge, by the device charger, the battery according to the charge capability of the battery over the connection.

Clause 17. The device charger of any of clauses 11, 12, 13, 14, 15, or 16, the processing system further configured to cause the device charger to: receive, from the trusted device, a remote credential request for authentication associated with the secure device ecosystem; and transmit, from the device charger, credentials associated with the secure device ecosystem and a pattern to the trusted device, where the pattern is registered with the device charger in the secure device ecosystem.

Clause 18. The device charger of any of clauses 11, 12, 13,14, 15, 16, or 17, the processing system further configured to cause the device charger to: receive, from the trusted device, a remote credential request for authentication with the secure device ecosystem; and transmit, from the device charger, credentials associated with the secure device ecosystem and registered with the device charger.

Clause 19. The device charger of any of clauses 11, 12, 13, 14, 15, 16, 17, or 18, where the device charger transmits the credentials within a time window.

Clause 20. The device charger of any of clauses 11, 12, 13, 14, 15, 16, 17, 18, or 19, where the device charger encrypts the credentials prior to transmission.

Clause 21. A wireless communication device for task offloading to a device charger, including: a processing system that includes one or more processors and one or more memories coupled with the one or more processors, the processing system configured to cause the wireless communication device to: transmit a context state associated with the wireless communication device within a secure device ecosystem, where the context state includes a task associated with the wireless communication device; receive, from the device charger, an acknowledgment of the task; offload the task to the device charger; and receive information associated with computations for the task from the device charger.

Clause 22. The wireless communication device of clause 21, where the acknowledgement indicates computational capabilities of the device charger to perform the task.

Clause 23. The wireless communication device of any of clauses 21 or 22, where offloading the task causes the wireless communication device to: transmit data associated with the task over a network to the device charger; and receive corresponding data from the device charger.

Clause 24. The wireless communication device of any of clauses 21, 22, or 23, where offloading the task causes the wireless communication device to: transmit, to the device charger, at least one file stored in memory for storage on a remote storage location associated with the wireless communication device.

Clause 25. The wireless communication device of any of clauses 21, 22, 23, or 24, where transmitting the at least one file causes the wireless communication device to: scan files stored in memory on the wireless communication device; detect an un-synced file from the files; and transmit, over a network, the un-synced file to the device charger for storage on a remote storage location associated with the wireless communication device.

Clause 26. The wireless communication device of any of clauses 21, 22, 23, 24, or 25, the processing system is further configured to cause the wireless communication device to: connect the wireless communication device with the device charger; transmit a charge capability of a battery associated with the wireless communication device to the device charger; and receive a charge, by the device charger, to the battery according to the charge capability of the battery over the connection.

Clause 27. The wireless communication device of any of clauses 21, 22, 23, 24, 25, or 26, the processing system is further configured to cause the wireless communication device to: transmit a remote credential request for authentication associated with the secure device ecosystem; and receive, from the device charger, credentials associated with the secure device ecosystem and a code pattern, where the pattern is registered with the device charger.

Clause 28. The wireless communication device of any of clauses 21, 22, 23, 24, 25, 26, or 27, the processing system is further configured to cause the wireless communication device to: transmit a remote credential request for authentication of the device charger; and receive, from the device charger, credentials associated with the secure device ecosystem and registered with the device charger.

Clause 29. The wireless communication device of any of clauses 21, 22, 23, 24, 25, 26, 27, or 28, where the wireless communication device receives the credentials within a time window from the device charger.

Clause 30. The wireless communication device of any of clauses 21, 22, 23, 24, 25, 26, 27, 28, or 29, where the credentials include a pattern associated with the device charger and the secure device ecosystem.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method for task offloading by a device charger, comprising:

receiving, at a device charger, a context state from a trusted device within a secure device ecosystem with the device charger, wherein the context state includes a task associated with the trusted device, wherein the trusted device and the device charger are authenticated with a multi-device credential and registered to a secure device service of the secure device ecosystem, the device charger including an installed unique identification indicating that the device charger is associated with other devices in the secure device ecosystem;

performing, at the device charger, computations associated with the task; and transmitting information associated with the computations from the device charger to the trusted device.

2. The method of claim 1, further comprising:

retrieving, prior to performing the computations, computational capabilities of the device charger; and verifying the computational capabilities of the device charger to perform the task.

3. The method of claim 1, wherein performing the computations associated with the task further comprises:

transmitting, from the device charger, data associated with the task over a network;

receiving corresponding data from the network; and transmitting the corresponding data from the device charger to the trusted device.

4. The method of claim 1, wherein performing the computations associated with the task further comprises:

receiving, from the trusted device, at least one file stored in memory on the trusted device; and transmitting, over a network, the at least one file to a remote storage location associated with the trusted device.

5. The method of claim 1, wherein performing the computations associated with the task further comprises:

scanning files, by the device charger, stored in memory on the trusted device;

detecting an un-synced file from the files; and transmitting, over a network, the un-synced file to a remote storage location associated with the trusted device.

6. The method of claim 1, further comprising:

connecting the device charger with the trusted device;

analyzing a charge capability of a battery associated with the trusted device; and charging, by the device charger, the battery according to the charge capability of the battery over a connection.

7. The method of claim 1, further comprising:

receiving, from the trusted device, a remote credential request for authentication associated with the secure device ecosystem; and transmitting, from the device charger, credentials associated with the secure device ecosystem including a pattern to the trusted device, wherein the pattern is registered with the device charger in the secure device ecosystem.

8. The method of claim 1, further comprising:

receiving, from the trusted device, a remote credential request for authentication with the secure device ecosystem; and transmitting, from the device charger, credentials associated with the secure device ecosystem and registered with the device charger.

9. The method of claim 8, wherein the device charger transmits the credentials within a time window.

10. The method of claim 8, wherein the credentials are encrypted prior to transmission.

11. A device charger for task offloading from a device, comprising:

a processing system that includes one or more processors and one or more memories coupled with the one or more processors, the processing system configured to cause the device charger to:

receive a context state from a trusted device within a secure device ecosystem with the device charger, wherein the context state includes a task associated with the trusted device, wherein the trusted device and the device charger are authenticated with a multi-device credential and registered to a secure device service of the secure device ecosystem, the device charger including an installed unique identification indicating that the device charger is associated with other devices in the secure device ecosystem;

perform computations associated with the task; and transmit information associated with the computations from the device charger to the trusted device.

12. The device charger of claim 11, the processing system further configured to cause the device charger to:

retrieve, prior to performing the computations, computational capabilities of the device charger; and verify the computational capabilities of the device charger to perform the task.

13. The device charger of claim 11, wherein performing the computations associated with the task cause the device charger to:

transmit data associated with the task over a network;

receive corresponding data from the network; and transmit the corresponding data from the device charger to the trusted device.

14. The device charger of claim 11, wherein performing the computations associated with the task cause the device charger to:

receive, from the trusted device, at least one file stored in memory on the trusted device; and transmit, over a network, the at least one file to a remote storage location associated with the trusted device.

15. The device charger of claim 11, wherein performing the computations associated with the task cause the device charger to:

scan files, by the device charger, stored in memory on the trusted device;

detect an un-synced file from the files; and transmit, over a network, the un-synced file to a remote storage location associated with the trusted device.

16. The device charger of claim 11, the processing system further configured to cause the device charger to:

connect the device charger with the trusted device;

analyze a charge capability of a battery associated with the trusted device; and charge, by the device charger, the battery according to the charge capability of the battery over a connection.

17. The device charger of claim 11, the processing system further configured to cause the device charger to:

receive, from the trusted device, a remote credential request for authentication associated with the secure device ecosystem; and transmit, from the device charger, credentials associated with the secure device ecosystem and a pattern to the trusted device, wherein the pattern is registered with the device charger in the secure device ecosystem.

18. The device charger of claim 11, the processing system further configured to cause the device charger to:

receive, from the trusted device, a remote credential request for authentication with the secure device ecosystem; and transmit, from the device charger, credentials associated with the secure device ecosystem and registered with the device charger.

19. The device charger of claim 18, wherein the device charger transmits the credentials within a time window.

20. The device charger of claim 18, wherein the device charger encrypts the credentials prior to transmission.

21. A wireless communication device for task offloading to a device charger, comprising:

a processing system that includes one or more processors and one or more memories coupled with the one or more processors, the processing system configured to cause the wireless communication device to:

transmit a context state associated with the wireless communication device within a secure device ecosystem, wherein the context state includes a task associated with the wireless communication device, wherein the wireless communication device and the device charger are authenticated with a multi-device credential and registered to a secure device service of the secure device ecosystem, the wireless communication device including an installed unique identification indicating that the wireless communication device is associated with other devices in the secure device ecosystem;

receive, from the device charger, an acknowledgement of the task;

offload the task to the device charger; and receive information associated with computations for the task from the device charger.

22. The wireless communication device of claim 21, wherein the acknowledgement indicates computational capabilities of the device charger to perform the task.

23. The wireless communication device of claim 21, wherein offloading the task causes the wireless communication device to:

transmit data associated with the task over a network to the device charger; and receive corresponding data from the device charger.

24. The wireless communication device of claim 21, wherein offloading the task causes the wireless communication device to:

transmit, to the device charger, at least one file stored in memory for storage on a remote storage location associated with the wireless communication device.

25. The wireless communication device of claim 24, wherein transmitting the at least one file causes the wireless communication device to:

scan files stored in memory on the wireless communication device;

detect an un-synced file from the files; and transmit, over a network, the un-synced file to the device charger for the storage on the remote storage location associated with the wireless communication device.

26. The wireless communication device of claim 21, the processing system is further configured to cause the wireless communication device to:

connect the wireless communication device with the device charger;

transmit a charge capability of a battery associated with the wireless communication device to the device charger; and receive a charge, by the device charger, to the battery according to the charge capability of the battery over the connection.

27. The wireless communication device of claim 21, the processing system is further configured to cause the wireless communication device to:

transmit a remote credential request for authentication associated with the secure device ecosystem; and receive, from the device charger, credentials associated with the secure device ecosystem and a code pattern, wherein the code pattern is registered with the device charger.

28. The wireless communication device of claim 21, the processing system is further configured to cause the wireless communication device to:

transmit a remote credential request for authentication of the device charger; and receive, from the device charger, credentials associated with the secure device ecosystem and registered with the device charger.

29. The wireless communication device of claim 28, wherein the wireless communication device receives the credentials within a time window from the device charger.

30. The wireless communication device of claim 28, wherein the credentials include a code pattern associated with the device charger and the secure device ecosystem.

* * * * *